US008176421B2

(12) United States Patent
Dawson et al.

(10) Patent No.: US 8,176,421 B2
(45) Date of Patent: May 8, 2012

(54) VIRTUAL UNIVERSE SUPERVISORY PRESENCE

(75) Inventors: Christopher J. Dawson, Arlington, VA (US); Carl P. Gusler, Austin, TX (US); Rick A. Hamilton, II, Charlottesville, VA (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 819 days.

(21) Appl. No.: 12/238,489

(22) Filed: Sep. 26, 2008

(65) Prior Publication Data
US 2010/0083138 A1 Apr. 1, 2010

(51) Int. Cl.
*G06F 3/048* (2006.01)
(52) U.S. Cl. ......... 715/706; 715/707; 715/757; 715/758
(58) Field of Classification Search .................. 715/706, 715/707, 757, 758, 848
See application file for complete search history.

(56) References Cited

U.S. PATENT DOCUMENTS

| 7,319,992 | B2 | 1/2008 | Gaos |
| 2007/0035549 | A1 | 2/2007 | Jung et al. |
| 2007/0043878 | A1 | 2/2007 | Carlson et al. |
| 2007/0106526 | A1 | 5/2007 | Jung et al. |
| 2007/0233839 | A1 | 10/2007 | Gaos |

FOREIGN PATENT DOCUMENTS

| WO | 00/04478 | 1/2000 |
| WO | 00/05639 | 2/2000 |
| WO | 01/50387 | 7/2001 |

*Primary Examiner* — Namitha Pillai
(74) *Attorney, Agent, or Firm* — Patrick J. Daugherty; Driggs, Hogg, Daugherty & Del Zoppo Co., LPA

(57) ABSTRACT

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.).

20 Claims, 2 Drawing Sheets

VIRTUAL UNIVERSE SUPERVISORY PRESENCE

FIELD OF THE INVENTION

The present invention generally relates to real-time monitoring and supervising of Virtual Universe (VU) user engagement and activities, and more particularly to methods, systems, and program products for providing customized and appropriate supervision and guidance directly to VU participants via supervising avatar entities associated with a user's avatar.

BACKGROUND OF THE INVENTION

A Virtual Universe (VU) is a computer-based simulated world or environment; other terms for VU's include metaverses, "3-D Internet" and Virtual World, and VU will be understood to represent any of these environments. Users inhabit and traverse a VU, and interact with other VU users through the use of an avatar, a graphical representation of the user often taking the form of a cartoon-like human though any graphic image may be utilized. In order to participate within or inhabit a VU a user creates an agent which functions as the user's account, and upon which the user builds an avatar tied to an inventory of assets the user owns in the VU and associated with the agent.

VU assets, avatars, the VU environment, and anything presented to a user as visual information comprise Universally Unique Identifiers (UUID's) tied to geometric data distributed to users as textual coordinates, textures distributed to users as graphics files (in some examples as a JPEG2000 file), and effects data rendered by the user's client computer according to the user's preferences and user's computer system device capabilities. Many VU's are represented using three dimensional (3-D) graphics and landscapes and are populated by many thousands of users or "residents," often resembling the real world or fantasy/fictional worlds in terms of physics, houses, landscapes and in interpersonal communications with other users.

Large robust VU's and massively multiplayer online games, such as for example Second Life® (SECOND LIFE is a trademark of Linden Research, Inc. in the United States and/or other countries), Entropia Universe™ (ENTROPIA UNIVERSE is a registered trademark of MindArk PE AB in the United States, other countries, or both), The Sims Online™ (THE SIMS ONLINE is a trademark of Electronic Arts, Inc in the United States, other countries, or both), and There™ (THERE is a trademark of Makena Technologies, Inc. in the United States, other countries, or both) render and display detailed, large and complex graphic environments within which users may travel and participate as if a character in an expressionistic or fantastical fictional world or within a realistic or representational approximation of real life.

VU's are also commonly defined with respect to VU regions, virtual areas of land within the VU typically residing on a single server, with each region amenable to provision and management by a one or more participating providers. The size and complexity and variety of resources found in a VU are related to the number of providers participating and hosting regions through server hosting. And the success of a VU may depend upon attracting users and keeping them engaged and participating in the VU environment, thereby adding value to the providers who bear the cost in providing VU region content and services (and correspondingly expect an appropriate level of multiple-user engagement as a return on their investment), as well as for other users who wish to engage many others in a large virtual community. For example, an informational or service-related region managed by a non-profit organization may desire or expect a given level of VU user engagement and participation, and commercial region providers may desire to engage in a given level of commercial transactions (e.g. sales) or achieve a level of marketing exposure among VU users.

Participants in virtual universes, whether novices or long-time residents, suffer from problems related to incomplete information about activities and resources in the virtual universe. Recent visitors or novice residents of virtual universes suffer from inefficiencies due to infancy: they have a limited knowledge of what is occurring in that universe, and they have a very limited and frequently incorrect understanding of what resources are available to them, and how to access those resources. Novices and visitors also generally lack an understanding of what the infrastructure and other residents expect of them, and how to behave in the virtual system. Thus, in one aspect, an unsupervised novice may have an unsatisfying VU experience, making the novice less likely to find value in engaging the VU and either remaining in engagement or returning for a subsequent engagement.

Long-time residents may also suffer from an inability to access information beyond their immediate horizon. The availability of new resources may be unknown to them or may be beyond the ability of conventional virtual advertising and notification systems to educate them. They may also not be aware of how their behavior is expected to change based on major new developments in the universe or its community. Long-time residents and those experienced in VU environment applications may also become disillusioned and less likely to consume or partake of services in a preferred or appropriate manner, sometimes actively and intentionally to disrupt the activities of other residents for entertainment. And as long-time and skilled residents are likely to have enough knowledge of the strengths and weaknesses of the virtual universe infrastructure (individually, but especially in groups) to enable unintentional or intentional stressing of the underlying infrastructure, their disruptive actions may interfere with the ability of the VU providers to provide quality experiences for other users, and in one respect may damage a positive sense of community within the VU unless they are properly supervised.

Prior art methods and processes for providing information and guidance to users with regard to proper behavior and the positive attributes of a VU commonly include books, magazines and newsletters (whether on-line or conventional). For novices school-like sessions in protected portions of the universe may be offered, in one respect where novices can attempt to matriculate from infants to adolescents. However, a user is generally required to actively seek out and choose to avail himself of such resources, and a user is not likely to voluntarily make this choice if investments of time, attention and effort are required, and even then a given resource may not appropriately or efficiently match the optimal learning style of the user. And the disillusioned griefer user bent on causing mischief cannot be expected to voluntarily observe all the rules and accepted norms of a given VU. Moreover, guideline resources are usually composed or programmed and then subsequently issued or implemented, and thus provide a relatively static articulation of the objectives of the virtual universe and the expected user which may become obsolete or even erroneous if not updated, adapted or modified as current norms shift within a given virtual universe.

SUMMARY OF THE INVENTION

Methods comprise monitoring a virtual universe resident avatar through an associated supervisory avatar. The engagement of a user avatar representing an agent account of a user within a virtual universe is monitored for an event occurrence. As a function of detecting an event occurrence a symbiont is associated with the user avatar. A symbiont type is selected from a plurality of symbiont types as a function of a user avatar characteristic and an objective of a virtual universe provider, each of the plurality of symbiont types comprising divergent agendas, and the symbiont is populated with the selected symbiont type. The populated symbiont also appears to the user as a supervising avatar.

The populated symbiont processes an event occurrence and determines an action as a function of an agenda of a selected symbiont type. The populated symbiont takes an action, including the supervising avatar communicating directly with the user avatar through a communication medium appropriate to the selected symbiont type and to a norm of avatar engagement of the virtual universe.

In another aspect, service methods are provided comprising deploying applications for monitoring a virtual universe resident avatar through an associated supervisory avatar according to the method steps described above, for example by a service provider who offers to implement, deploy, and/or perform functions for others. Still further, articles of manufacture comprising a computer usable medium having a computer readable program in said medium are provided. Such program code comprises instructions which, when executed on a computer system, cause the computer system to perform one or more method and/or process elements described above for monitoring a virtual universe resident avatar through an associated supervisory avatar, for example as described above. Moreover, systems, articles and programmable devices configured for performing one or more method and/or process elements of the current invention are also provided for monitoring a virtual universe resident avatar through an associated supervisory avatar, for example as described above.

BRIEF DESCRIPTION OF THE DRAWINGS

These and other features of this invention will be more readily understood from the following detailed description of the various aspects of the invention taken in conjunction with the accompanying drawings in which.

Figure 1:
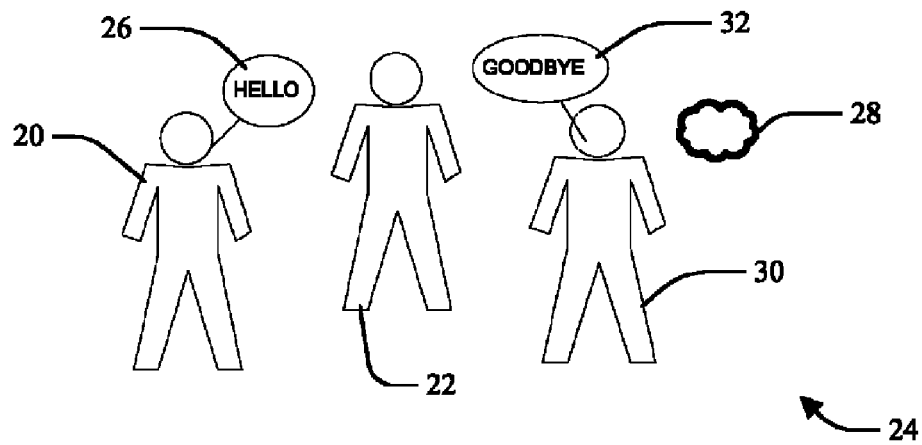
FIG. 1 is a block diagram illustration of a virtual universe avatar engagement according to the present invention.

The drawings are not necessarily to scale. The drawings are merely schematic representations, not intended to portray specific parameters of the invention. The drawings are intended to depict only typical embodiments of the invention and, therefore, should not be considered as limiting the scope of the invention. In the drawings, like numbering represents like elements.

DETAILED DESCRIPTION OF THE INVENTION

For convenience purposes, the Detailed Description of the Invention has the following sections:

I. General Description; and
II. Computerized Implementation.

I. General Description

As discussed generally above, participants in a virtual universe are known as users or residents and are associated with and engage the virtual universe through a life-like entity typically called an "avatar." The participant can choose and customize both the basic appearance and also the attire of the avatar, including both positive and offensive appearances. The participant controls the actions, behavior, and interactions of his/her avatar with other participants, including both positive and offensive behaviors. In one aspect the user's avatar represents an extension of the user into a unique VU world, wherein the experience for the user is enhanced in proportion to the degree with which the engagement of his avatar with other avatars in the VU approximates real-world person-to-person engagements.

The VU environment offers advantages in introducing and implementing real-world interpersonal communication skills and efficiencies in networked communications with other people and entities through their avatars. Rather than expending effort and time in translating communications and tasks into a computer application-specific inputs (for example, using a browser to navigate to a web page and find a text dialog box, etc.), the VU user may simply immerse himself into VU and assume the role of his avatar, talking with other avatars and moving and grabbing objects as if in real-life. In one aspect the ability of the VU to convey an illusion of entering another world is improved by reducing reminders to the user that he is only participating in a computer program and bringing the user back to reality and ruining the experience, for example pulling back the curtain on the suspension of disbelief required for a user to enter and engage a fictional or fantastical VU environment.

As in real-life the VU participant has access to only so much information about the VU and its possible actions and other occupants, mostly through direct personal observation of the immediate surroundings through the VU graphical interface. The participant can receive a limited amount of direct communication about the VU beyond what is immediately observable through VU communication channels such as chat conversations, telephone calls, e-mail, and instant messaging, or through text and other media information channels such as VU billboards, maps, flyers, newspapers, books, and web pages. Though the user may seek out guidebooks, tutorials and other forms of informational material, this requires diligence and effort on the part of the user, who may instead merely wander aimlessly, founder or engage in inappropriate activities through their avatar as they engage the VU environment.

Referring now to FIG. 1, a user avatar 22 is illustrated engaging another second avatar 20 through a communication 26 within a virtual universe 24. According to the present invention activities of the user avatar 22 are monitored for one or more specific activities of concern, and in the present example the monitored engagement 26 of the second avatar 20 triggers the invoking of a symbiont 28. Invoking the symbiont 28 initiates a symbiont type selection from a plurality of possible symbiont types having different or divergent agendas. In some embodiments the selection is a function of one or more user avatar 22 characteristics and/or of an objective of a virtual universe provider. Once an appropriate symbiont type is selected, the symbiont 28 is populated with the selected type, the populated symbiont appearing to, or otherwise represented to, the user avatar 22 as the supervisory avatar 30.

The populated symbiont 28 is thus enabled to process the event occurrence engagement 26 to determine and take an appropriate action as a function of an agenda of the selected symbiont type. The supervisory avatar 30 may communicate directly with either or both of user avatar 22 and the second avatar 20 through a communication medium 32 appropriate to the selected symbiont type and to a norm of avatar engagement of the virtual universe, in the present example the communication 32 terminating the conversation engagement 26 initiated by the second avatar 20.

Figure 2:
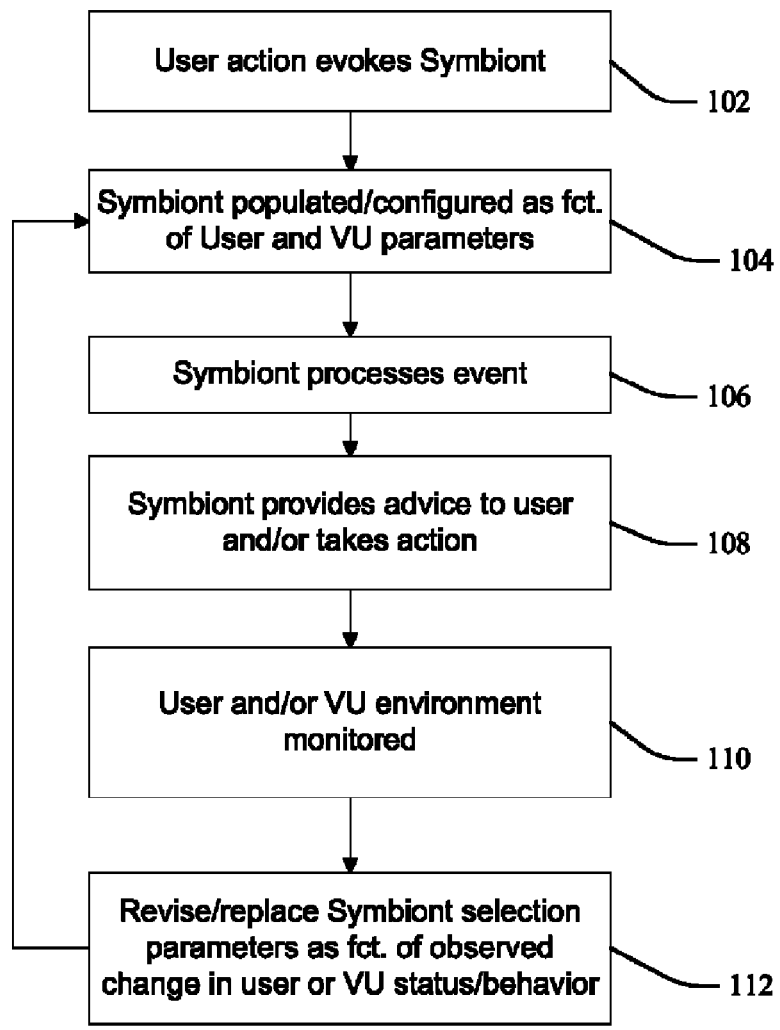
FIG. 2 is a flow chart illustrating a process and system for monitoring virtual universe resident avatars through associated supervisory symbiont avatars according to the present invention.

FIG. 2 illustrates a method and process for associating a symbiont with a user avatar, for example the symbiont 28 and user avatar 22 of FIG. 1, wherein the symbiont is configured to engage the user avatar in the form of a supervisory avatar and directly provide user-specific guidance, instruction, assistance, and supervision. At 102 a resident or user engages a virtual universe (VU) in an event that invokes association with a supervising super-avatar or symbiont having at least one agenda and special powers according to the present invention. The symbiont may be associated with the user at all times, with a constant or contextual presence, and thus the engaging event may include a log-in event; in other embodiments the symbiont is invoked in response to one or specific events, such as query or request for help or information by the user or an other action by the user or his avatar indicating a need for assistance, guidance or supervision.

In one advantage, the symbiont can communicate directly with the participant user via his avatar, and may thus engage the participant as any other participant avatar may within the engagement context provided by the VU (in effect, appearing to the participant as another user or character within the VU.) The symbiont may be configurable by the user and/or an owner or region provider of the VU as function of a user characteristic or preference, and thus in one advantage the VU experience of the user may be enhanced by allowing him to set symbiont presentation format preferences, improving the user experience in engaging the symbiont.

The symbiont invoked is configured at 104 with at least one agenda, the agenda determined as a function ("fct.") of participant characteristics and an objective of the VU. In one example the user characteristic is a level of experience within the VU, wherein a novice-specific symbiont is configured to provide assistance appropriate to a newcomer user and a "concierge" symbiont is configured to provide assistance appropriate for an experienced user. A variety of VU objectives may be considered, for example to provides symbionts with agendas designed or selected to make the VU life experience challenging and more interesting for a user, in some examples differentiated and selected response to novice or advanced user characteristics, in one aspect as discussed more fully below.

At 106 the symbiont processes an event as a function of one or more specified agendas; for example, parses a query from the associated participant avatar or a chat or instant messaging (IM) communication between the participant and another VU avatar/participant, or detects an action by the associated participant avatar or other party avatar/participant through monitoring avatar activity. And at 108 the symbiont performs one or more actions with respect to the associated participant avatar as a function of processing the event in view of the at least one symbiont agenda. The performed action may include suggesting a course of action to the associated participant avatar, for example suggesting travel to another location by teleportation, suggesting an answer or other text communication in response to a communication with another VU participant avatar, or suggesting initiating or terminating contact with another VU participant avatar or otherwise counseling or guiding the associated participant avatar into a specific activity. The performed action may include automatically and directly taking a course of action with respect to the associated participant avatar, for example automatically teleporting the associated participant avatar to another location; engaging in a text communication directly with another VU participant avatar (in some examples even assuming the identity of or populating the associated participant avatar); directly initiating or terminating a contact of the associated participant avatar with another VU participant avatar; or ordering or requiring the associated participant avatar to engage in a mandatory non-discretional activity, in some examples making continued user engagement in the VU conditional on his observation of the requirement.

The supervising symbiont invoked or provided at 102 can fulfill a number of roles or agendas within the VU, and divergent symbionts may be invoked in response to divergent events or associated participant avatar actions. In one aspect at the symbiont process or application monitors the status of the associated user or his avatar or the VU environment at 110 and dynamically revises or replaces the invoked symbiont at 112 as a function of said status change. Thus, the same symbiont invoked at 102 may change or evolve as associated participant avatar characteristics or VU objectives change, thus providing dynamic VU guidance. In another aspect, multiple symbionts may be associated with any given associated participant avatar, each providing divergent agendas and functions for the associated participant avatar, and thus a substitute or additional symbiont may be invoked and associated at 112.

Figure 3:
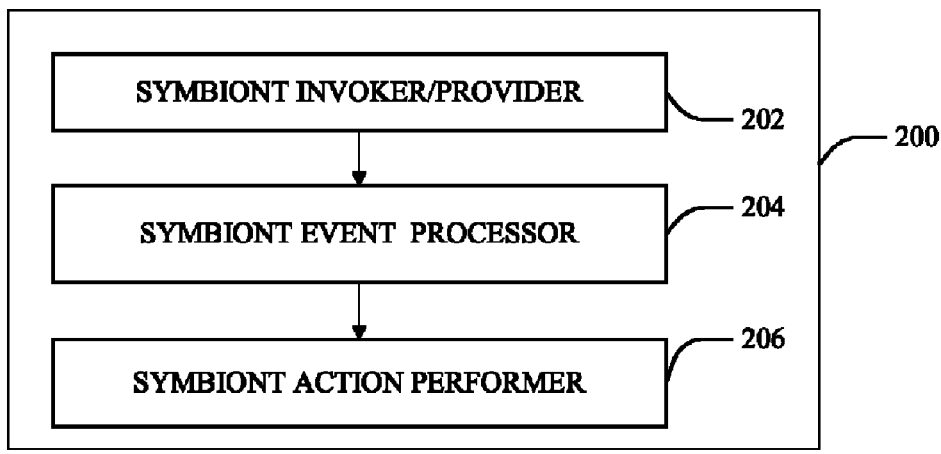
FIG. 3 is a block diagram illustration of a symbiont according to the present invention.

In some embodiments, a symbiont is provided primarily by software or other programming application operating in the VU, wherein it is configurable by either the human participant and/or an owner or region provider of the VU. FIG. 3 illustrates one symbiont application 200 comprising a symbiont avatar ("SA") invoker component 202 which selects or configures the symbiont as a function of one or more participant characteristics and/or objectives of the VU. Thus, user experience or status data may be used to select between novice-specific and concierge symbiont configurations, and monitored behavior may indicate a degree of supervision or intervention required by the supervisory symbiont. VU objectives, for example making the VU life experience challenging and more interesting, in some examples as further dependent on historical user experience and behavior data, may be used to select from a variety of symbiont types for invoking the symbiont, for example as discussed more fully below.

The symbiont 200 further comprises an event processor 204 for processing an event as a function of one or more agendas specific to the symbiont or symbiont-type invoked by invoker 202. Thus, the event processor 204 may parse written or spoken text communications from the associated participant avatar or another VU avatar/participant and determine an appropriate response communication or other action, or detect a user of other resident avatar action and identify or determine an appropriate responsive action. Actions recommended or directed by the event processor 204 are performed as a function of the invoked symbiont (and thus as a function of user or VU status, VU objectives or symbiont agendas) by the performer component 206. Exemplary performed actions include suggesting or requiring text or spoken communications for adoption and use by the user avatar or teleportation to another location or engagement with a certain available avatar, and directly taking a course of action on behalf of the user or his avatar, and other examples are provided below.

More particularly, multiple types of symbionts may be provided for selection or configuration. For example a first type of "Guardian Angel" symbiont may be provided or configured to monitor an associated user avatar's location, communications, activities, surroundings, contacts, etc., and to intervene directly in the user's activities or surroundings to suggest or take actions as a function of an agenda defined by an anticipated user's best interest. In some examples, the Guardian Angel symbiont may take the associated user avatar places they should go, initiate contact with people they should meet, or terminate contact with people they should not meet with the full knowledge of the user, the Guardian Angel agenda generally straightforward and transparent and understood by the associated participant avatar. Generally the suggestions and actions of the Guardian Angel are overt and readily understood by the associated participant avatar as beneficial and in the associated participant avatar's best interest.

In another example, a second type "Athena" symbiont monitors the user's activities and provides supervision, guidance and counsel as a function of some more complex and less transparent/more opaque positive agenda, one that the user would generally agree with if they understood all the associated issues and objectives, but would also be generally beyond the grasp or understanding of the associated participant avatar. (The properties and agendas of some embodiments of Athena symbionts may be defined and understood by reference to novels *The Iliad* and *The Odyssey* by Homer.) For example, a user avatar's engagement with a certain second user avatar may be problematic due to a violation through ignorance or insensitivity of a cultural, political or business norm as perceived by another user or VU region provider, and may not be convinced of the problem even if made aware, hence the Athena may directly take action to resolve the problem. The Athena symbiont may be particularly appropriate for use in providing assistance and guidance to VU novices as such parties may not be expected to have the experience necessary to understand how the Athena's suggestions or actions are beneficial, or to understand all of the motivations behind Athena actions.

In another aspect, a symbiont may intervene against an associated participant avatar's short term interests to serve the higher interests of the larger VU "world," for example steering the participant avatar away from activities that place high or unreasonable demands on VU resources to the detriment of the overall "collective" needs of the VU, or even disabling capabilities or terminating VU sessions or engaging in other direct interventions. Thus, where the undesirability of an associated user avatar action is readily apparent and understood with guidance intervention may be accomplished through overt Guardian Angel-type symbiont methods and processes. And in contrast, intervention may be more appropriately accomplished through Athena-type symbiont methods and processes if motivations and actions are complex, opaque or otherwise applied without knowledge, understanding and consent of the associated participant user avatar.

A third type "Aphrodite" symbiont example may also be provided and configured to monitor the user's activities, etc. and provide appropriate guidance and counsel as a function of an agenda which the associated avatar user might not agree with, even if they understood all the issues and objectives. (The properties and agendas of some embodiments of Aphrodite symbionts may also be defined and understood by reference to novels *The Iliad* and *The Odyssey* by Homer.) The Aphrodite symbiont may prioritize or focus on a user's short term or long term interests as a function of a third party or VU interest or objective, said priority or focus not a function of any known interest or objective of the user and perhaps even in contravention thereof. Thus an Aphrodite symbiont may provide information about goods or services to a user as a function of a commercial or other third party or entity objective unknown to the user, push-advertising a paid advertiser's product in response to parsing an associated user avatar chat or IM message for relevant terms. Some Aphrodites may steer a user avatar toward a conversation with another avatar serving a commercial entity, or suggest or directly teleport the user to a commercial sponsor or provider region of the VU.

Symbiont types and configurations may be selected and configured as a function of individual associated user avatar characteristics, and also to serve multiple users or the VU as a whole. For example, a general "Mayor" or "Policeman" type of symbiont may be provided, enabled to directly communicate and interact with and influence an associated participant avatar as well as multiple other users simultaneously, in one aspect associated with the hosting VU universe in general by monitoring the activities and locations of multiple users. In one aspect, a Policeman symbiont may be configured to monitor and prevent mischief makers and griefers from disrupting or rendering a VU environment dangerous or unusable. A Policeman/Mayor symbiont may provide guidance and counsel, but also has a significant agenda and will interact with resident users as a function of each user's compliance with the objectives of a larger VU universal agenda. In some embodiments the Policeman/Mayor symbiont focuses on activities of experienced users pushing the boundaries of the community and the infrastructure, for example steering them away from activities that are resource hogs to the overall "collective" VU world interest, intervening in intimidation situations between different participant avatars, directing participant avatars away from locations associated with recent or historical trouble incidents, disabling participant avatar capabilities, terminating participant avatar sessions or engaging in other direct interventions.

Thus, the supervising symbiont can fulfill a number of roles or agendas within the VU, and divergent symbionts may be invoked in response to divergent events or associated participant avatar actions. In one aspect, an invoked symbiont type may be dynamically revised or replaced at 112 as a function of an observed change in monitored user or VU status or avatar activities at 110. In some examples the same symbiont avatar invoked at 102 may change or evolve or be repopulated as associated participant avatar characteristics or VU objectives change, thus providing dynamic VU guidance; and in other examples additional or multiple symbionts may become associated with any given associated participant avatar at 112, each providing divergent agendas and functions for the associated participant avatar.

Symbionts may have distinctive labeling, markings, appearance, etc. that readily inform users of their status or powers; or their divergent abilities may be undeclared or announced to a user, for example a single symbiont may be assigned to a participant avatar and project a constant outward appearance and demeanor to the user while dynamically changing or toggling through any of the divergent symbiont types, function and objectives described above.

Overt notice to a user of an agenda or function of a symbiont associated with his avatar may be provided through graphic indicators, and these indicators may dynamically change, revise or evolve as user or VU status or symbiont objectives change, thus providing real-time notice to the user and enhancing transparency and trust in the VU by the user. For example, a symbiont character may morph into a Policeman in response to the occurrence of inappropriate user avatar activities, or into a "clergy" symbiont to provide moral guidance in response to an ambiguous or questionable choice, communication or opportunity. Symbionts may also reveal aspects of their agendas by assuming specific identities: thus the objectives of a well-known trademarked character symbiont may be transparent and understood within the context of user knowledge of the identified corporate trademark owner.

A symbiont may be empowered to change associated user avatar actions, operations, and configurations on either a server side (the VU world grid) or the client side of the associated user avatar engagement, sometimes including taking action with respect to VU operations, and configurations which the user may not be aware of or have control over. In some examples, a symbiont may move an associated participant avatar at anytime, including to places the user is not aware of or may not have permission to visit. Symbionts may change an associated participant avatar's inventory possessions and cash level, or impersonate an associated participant avatar in an engagement with another VU participant avatar, even initiating a VU session without the presence of the actual associated user. They may modify or terminate an associated user avatar session, or change their own or the associated user avatar's appearance or abilities, or modify or transform VU surroundings engaged by the associated user avatar or otherwise presented to the user through the VU environment, for example increasing or decreasing grid power applied to user's session. In one aspect the symbiont may thus take direct actions or urge a user to take actions that drive changes in users' behavior or attributes in furtherance of a benefit to the overall virtual universe.

Aspects and attributes of a symbiont may dynamically vary a function of variety of objectives or parameters. The characteristics of a supervising symbiont can change through time as it learns how to interact with the associated user (e.g. it may learn that the user prefers text to audio or video when receiving instructions by user preferences and feedback. A supervising symbiont may be visible or invisible to the associated avatar/user and/or to other avatars, or may assume different appearance characteristics or capabilities as a function of preferences associated with the resident ID of another VU participant avatar: thus in one embodiment a fanciful "genie" symbiont character is visible to a first "friends" group of residents, but a second "employer" group will see a discrete, business-appropriate character, if the symbiont is rendered visible at all. Aspects and attributes may be dependent upon a locations occupied by or landmarks proximate to the associated user avatar, for example another VU participant avatar in your virtual home or other private areas can see your supervising symbiont but it cannot be seen in a public area of the VU.

Symbiont aspects and attributes may also be dependent upon VU status or operational situations: for example a supervising avatar can be seen as a function of CPU cycles or loading levels, network bandwidth, if an emergency situation exists, if another avatar makes an explicit request to see your supervising avatar, etc. Aspects and attributes may be VU-dependent wherein user avatars are configured to function in more than one virtual universe or domain, for example visible in a first VU but not in a second.

II. Computerized Implementation

Figure 4:
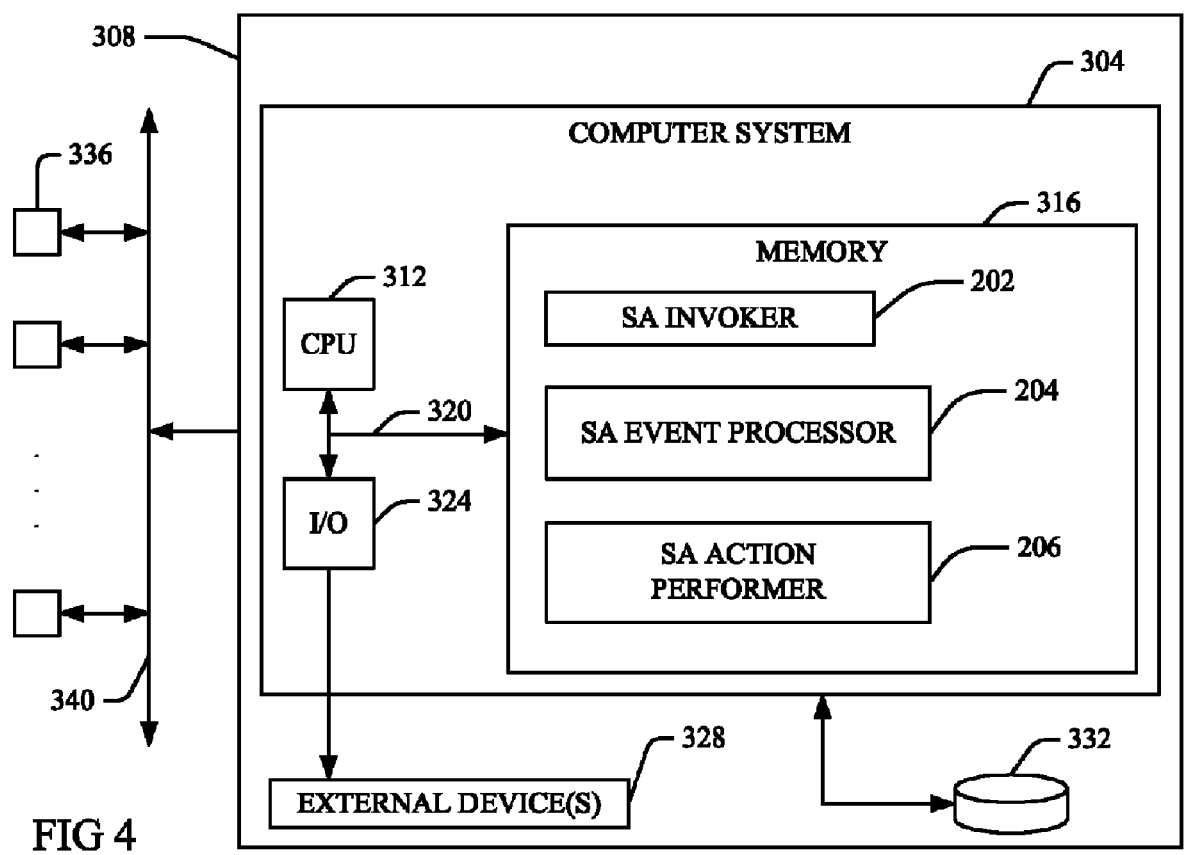
FIG. 4 is a block diagram illustrating an exemplary computerized implementation of a system and method for monitoring virtual universe resident avatars through associated supervisory symbiont avatars according to the present invention.

The present invention may be implemented using conventional software tools and methods applicable to virtual universes, for example within a stand-alone VU application, or as a plug-in to an existing VU application. The system and mechanisms described could be implemented in a hosting system or grid for a virtual universe or in client software for the virtual universe installed on a user's personal computer or other programmable device. Referring now to FIG. 4, an exemplary computerized implementation includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the process and system for monitoring virtual universe resident avatars through associated supervisory symbiont avatars illustrated in FIGS. 1 and 2 and described above, including symbiont provider/invoker 202, event processor 204 and action performer 206 components discussed above, which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 4 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to monitor virtual universe resident avatars through associated supervisory symbiont avatars. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.), and/or as a data signal (e.g., a propagated signal) traveling over a network (e.g., during a wired/wireless electronic distribution of the program code).

Still yet, computer infrastructure 308 is intended to demonstrate that some or all of the components of implementation could be deployed, managed, serviced, etc. by a service provider who offers to implement, deploy, and/or perform the functions of the present invention for monitoring virtual universe resident avatars through associated supervisory symbiont avatars for others, for example by licensing methods and browser or application server technology according to the present invention to an internet service providers (ISP) or cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the invention for monitoring virtual universe resident avatars through associated supervisory symbiont avatars for one or more customers, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for monitoring a virtual universe resident avatar through an associated supervisory avatar, comprising:
monitoring an engagement of the a user avatar with a virtual universe for an event occurrence, the user avatar representing an agent account of a user within the virtual universe;
associating a symbiont with the user avatar as a function of detecting the event occurrence through the monitoring;
selecting a symbiont type from a plurality of symbiont types as a function of a user avatar characteristic and an objective of a virtual universe provider, each of the plurality of symbiont types comprising divergent agendas selected from a plurality of agendas comprising a first agenda beneficial to an interest of the user avatar, and a second agenda that is in contravention to an interest of the user avatar and beneficial to an interest of a third party or the virtual universe provider;
populating the symbiont with the selected symbiont type;
the populated symbiont appearing to the user as a supervising avatar associated with the user avatar and having a distinctive visual character appearance informative to the user of the agenda of the supervising avatar as the first or the second agenda;
the populated symbiont processing the event occurrence and determining an action as a function of the first or second agenda of the selected symbiont type; and
the populated symbiont taking the determined action.

2. The method of claim 1 wherein the plurality of agendas further comprises a third agenda that is opaque to the user with respect to being beneficial to or in contravention to an interest of the user avatar;
wherein the distinctive visual character appearance of the populated symbiont is further informative to the user of the agenda of the supervising avatar as the first, second or third agenda; and
wherein the populated symbiont processes the event occurrence and determines the action as a function of the first, second or third agenda of the supervising avatar.

3. The method of claim 2 further comprising, in response to at least one of a user status change and a virtual universe environment status change:
dynamically replacing the selected and populated symbiont type with a revised symbiont type having a different one of the first, second or third agendas as a function of the characteristic of the user avatar and the objective of a virtual universe provider; and the populated symbiont appearing to the user as a revised supervising avatar associated with the user avatar and having a distinctive visual character appearance informative to the user of the revised, different one of the first, second or third agenda of the revised supervising avatar.

4. The method of claim 2 wherein the user avatar characteristic is a level of experience of the user avatar relative to the virtual universe.

5. The method of claim 4 wherein taking the determined action comprises at least one of:
the supervising avatar communicating a suggested a course of action to the user avatar;
the supervising avatar communicating a required a course of action to the user avatar, and the populated symbiont taking a direct action with respect to the user avatar if the user fails to take the required course of action; and
the populated symbiont automatically taking the direct action.

6. The method of claim 5 wherein automatically taking the direct action comprises at least one of:
teleporting the user avatar to a virtual universe region; and
terminating an engagement of the user avatar with a second avatar.

7. The method of claim 6, wherein taking the determined action comprises at least one of:
changing a client-side user avatar configuration; and
changing a server-side virtual universe environment setting.

8. A service for monitoring a virtual universe resident avatar through an associated supervisory avatar, comprising:
providing a computer infrastructure comprising a processing means, a memory in communication with the processing means and a network interface in communication with a virtual universe, wherein the processing means is configured to:
monitor an engagement of a user avatar with the virtual universe for an event occurrence, the user avatar representative of an agent account of a user;
associate a symbiont with the user avatar as a function of detecting the event occurrence through the monitoring;
select a symbiont type from a plurality of symbiont types as a function of a user avatar characteristic and an objective of a virtual universe provider, each of the plurality of symbiont types comprising divergent agendas selected from a plurality of agendas comprising a first agenda beneficial to an interest of the user avatar, and a second agenda that is in contravention to an interest of the user avatar and beneficial to an interest of a third party or the virtual universe provider;
populate the symbiont with the selected symbiont type, wherein the populated symbiont is configured to appear to the user as a supervising avatar associated with the user avatar and having a distinctive visual character appearance informative to the user of the agenda of the supervising avatar as the first or the second agenda;
wherein the populated symbiont is configured to process the event occurrence and determine an action as a function of the first or second agenda of the selected symbiont type; and
wherein the populated symbiont is configured to take the determined action.

9. The service of claim 8, wherein the plurality of agendas further comprises a third agenda that is opaque to the user with respect to being beneficial to or in contravention to an interest of the user avatar;
wherein the distinctive visual character appearance of the populated symbiont is further informative to the user of the agenda of the supervising avatar as the first, second or third agenda; and
wherein the populated symbiont is further configured to process the event occurrence and determine the action as a function of the first, second or third agenda of the supervising avatar.

10. The service of claim 9, wherein the processing means is further configured to, in response to at least one of a user status change and a virtual universe environment status change:
dynamically replace the selected and populated symbiont type with a revised symbiont type having a different one of the first, second or third agendas as a function of the characteristic of the user avatar and the objective of a virtual universe provider; and
wherein the populated symbiont appears to the user as a revised supervising avatar associated with the user avatar and having a distinctive visual character appearance informative to the user of the revised, different one of the first, second or third agenda of the revised supervising avatar.

11. The service of claim 10, wherein the populated symbiont is configured to at least one of:
automatically teleport the user avatar to a virtual universe region; and
terminate an engagement of the user avatar with a second avatar.

12. The service of claim 11, wherein the processing means is further configured to take the determined action by at least one of changing a client-side user avatar configuration, and changing a server-side virtual universe environment setting.

13. An article of manufacture, comprising:
a tangible computer readable storage medium comprising computer executable program code stored thereon and the program code comprising instructions which, when executed on a computer system, cause the computer system to:
monitor an engagement of a user avatar with a virtual universe for an event occurrence, the user avatar representative of an agent account of a user;
associate a symbiont with the user avatar as a function of detecting the event occurrence through the monitoring;
select a symbiont type from a plurality of symbiont types as a function of a user avatar characteristic and an objective of a virtual universe provider, each of the plurality of symbiont types comprising divergent agendas selected from a plurality of agendas comprising a first agenda beneficial to an interest of the user avatar, and a second agenda that is in contravention to an interest of the user avatar and beneficial to an interest of a third party or the virtual universe provider;
populate the symbiont with the selected symbiont type, wherein the populated symbiont is configured to appear to the user as a supervising avatar associated with the user avatar and having a distinctive visual character appearance informative to the user of the agenda of the supervising avatar as the first or the second agenda;

the populated symbiont configured to process the event occurrence and determine an action as a function of the first or second agenda of the selected symbiont type; and the populated symbiont configured to take the determined action.

14. The article of manufacture of claim 13, wherein the plurality of agendas further comprises a third agenda that is opaque to the user with respect to being beneficial to or in contravention to an interest of the user avatar;

wherein the distinctive visual character appearance of the populated symbiont is further informative to the user of the agenda of the supervising avatar as the first, second or third agenda; and wherein the program code instructions, when executed on the computer system, further cause the populated symbiont to process the event occurrence and determine the action as a function of the first, second or third agenda of the supervising avatar.

15. The article of manufacture of claim 14, wherein the program code instructions, when executed on the computer system, further cause the computer system to, in response to at least one of a user status change and a virtual universe environment status change:

dynamically replace the selected and populated symbiont type with a revised symbiont type having a different one of the first, second or third agendas as a function of the characteristic of the user avatar and the objective of a virtual universe provider; and cause the populated symbiont to appear to the user as a revised supervising avatar associated with the user avatar and having a distinctive visual character appearance informative to the user of the revised, different one of the first, second or third agenda of the revised supervising avatar.

16. The article of manufacture of claim 15, the program code comprising instructions which, when executed on the computer system, further cause the populated symbiont to at least one of:

automatically teleport the user avatar to a virtual universe region; and terminate an engagement of the user avatar with a second avatar.

17. The article of manufacture of claim 13, the program code comprising instructions which, when executed on the computer system, further cause the computer system to take the determined action by at least one of changing a client-side user avatar configuration, and changing a server-side virtual universe environment setting.

18. A programmable device comprising:

a processing means;

a memory in communication with the processing means comprising a symbiont provider logic component, an event processor logic component and an action performer logic component; and a network interface in communication with the processing means and the memory; wherein the processing means is configured to use the event processor logic component to monitor an engagement of a user avatar, within a virtual universe for an event occurrence, the user avatar representative of an agent account of a user;

wherein the processing means is configured to use the symbiont provider logic component to associate a symbiont with the user avatar as a function of detecting the event occurrence, select a symbiont type from a plurality of symbiont types as a function of a user avatar characteristic and an objective of a virtual universe provider, each of the plurality of symbiont types comprising divergent agendas selected from a plurality of agendas comprising a first agenda beneficial to an interest of the user avatar and a second agenda that is in contravention to an interest of the user avatar and beneficial to an interest of a third party or the virtual universe provider, and populate the symbiont with the selected symbiont type, the symbiont configured to appear to the user as a supervising avatar associated with the user avatar and having a distinctive visual character appearance informative to the user of the agenda of the supervising avatar as the first or the second agenda;

wherein the processing means is configured to use the action performer logic component to process the event occurrence and determine an action as a function of the first or second agenda of the selected symbiont type; and wherein the populated symbiont is configured to take the determined action.

19. The programmable device of claim 18, wherein the plurality of agendas further comprises a third agenda that is opaque to the user with respect to being beneficial to or in contravention to an interest of the user avatar;

wherein the distinctive visual character appearance of the populated symbiont is further informative to the user of the agenda of the supervising avatar as the first, second or third agenda; and wherein the processing means is configured to use the action performer logic component to process the event occurrence and determine the action as a function of the first, second or third agenda of the supervising avatar.

20. The programmable device of claim 19 wherein the user avatar characteristic is a level of experience of the user avatar relative to the virtual universe;

wherein the processing means is configured to, in response to at least one of a user status change and a virtual universe environment status change, use the symbiont provider logic component to dynamically replace the selected and populated symbiont type with a revised symbiont type selected from the plurality of symbiont types and having a different one of the first, second or third agendas, the populated symbiont appearing to the user as a revised supervising avatar associated with the user avatar and having a distinctive visual character appearance informative to the user of the revised, different one of the first, second or third agenda of the revised supervising avatar; and wherein the populated symbiont is configured to take the determined action by at least one of:

the supervising avatar communicating a suggested a course of action to the user avatar;

the supervising avatar communicating a required a course of action to the user avatar and taking a direct action with respect to the user avatar if the user fails to take the required a course of action;

automatically teleporting the user avatar to a virtual universe region; and terminating an engagement of the user avatar with a second avatar.

* * * * *